Jan. 14, 1930.   J. W. PLATT ET AL   1,743,685
SAFETY GAS VALVE LOCK
Filed Jan. 8, 1929
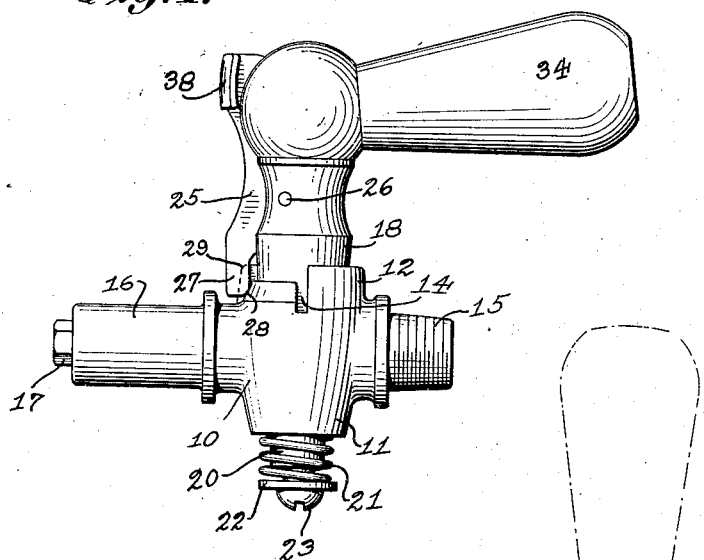
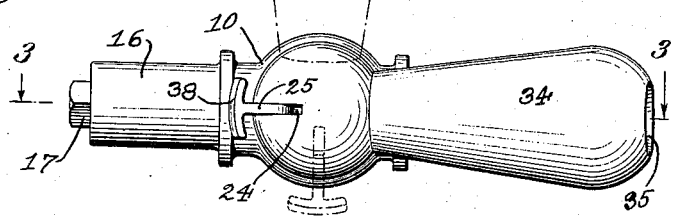
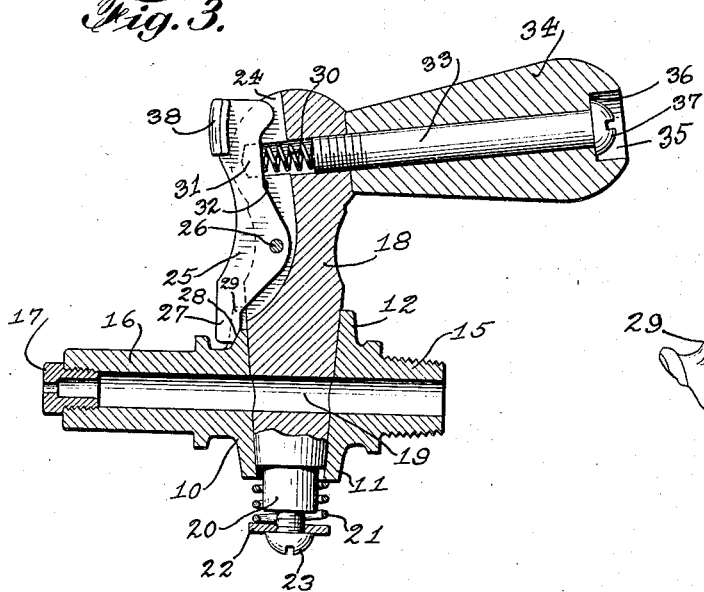
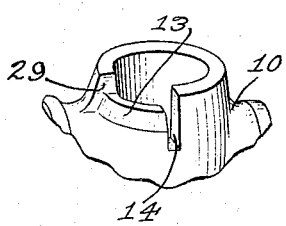
INVENTORS
John W. Platt,
Arthur E. Kramer
BY H. G. Manning
ATTORNEY Patented Jan. 14, 1930

1,743,685

UNITED STATES PATENT OFFICE

JOHN WHITE PLATT AND ARTHUR EARL KRAMER, OF WATERVILLE, CONNECTICUT

SAFETY GAS-VALVE LOCK

Application filed January 8, 1929. Serial No. 331,008.

This invention relates to valves, and more particularly to a safety valve cock for a gas range having means to prevent the gas from being accidentally turned on.

One object of this invention is to provide a locking device for a gas valve plug comprising a lever pivoted on said plug, said lever being spring-pressed to cause it to automatically snap into a catch slot in the valve body when the valve is closed.

A further object is to provide a device of the above nature which will be simple in construction, inexpensive to manufacture, easy to manipulate, compact, ornamental in appearance, and very efficient and durable in use.

With these and other objects in view there has been illustrated on the accompanying drawings one form in which the invention may be conveniently embodied in practice.

Fig. 1 represents a side view in elevation of the gas valve shown in open position.

Fig. 2 is a top view of the same showing in dotted lines the closed position of the valve.

Fig. 3 is a vertical side sectional view taken along the line 3—3 of Fig. 2.

Fig. 4 is a fragmentary perspective view of the upper portion of the valve body showing the lever-locking slot in its upper periphery.

Referring now to the drawings in which like reference numerals denote corresponding parts throughout the several views, the numeral 10 indicates a valve body formed substantially in the shape of a T and having an enlarged tapered bottom leg 11 and a similarly enlarged tapered upper leg 12. The leg 12 is cut away as shown in Fig. 4 to form a beveled sector 13, and has a vertical slot 14 extending downwardly at one end of said sector for a purpose to be hereinafter described.

The valve body 10 also includes a horizontal threaded nipple 15 adapted to be connected to a gas supply pipe, not shown, and an oppositely extending cylindrical pipe 16 having a small tubular screw plug 17 screwed into the end thereof, said screw plug comprising a gas regulating nozzle.

The gas valve is controlled by a vertical tapered plug 18 adapted to fit accurately within a conical seat in the valve body 10. The plug 18 has a transverse passage 19 near its lower end adapted to aline with central passages in the nipple 15 and pipe section 16 when the valve is in open position. The plug 18 has a reduced cylindrical bottom section 20, surrounding which is a helical spring 21 held between the leg 11 and a washer 22 which in turn is held by the head 23 of a set screw in order to hold the valve plug 18 tightly in position.

The upper part of the plug 18 above the leg 12 is provided with a vertical arcuate recess 24 within which is located a thin locking lever 25 pivoted on a pin 26 extending across the lower part of said recess. The lever 25 has a vertical reduced lower extremity 27 adapted to be fitted within the slot 14 when the valve is in closed position. The reduced extremity 27 has an inclined rear end 28 adapted to slide against the beveled sector 13 when the valve is being swung from closed to open position, and vice versa.

As will be clearly seen from Fig. 4, a shoulder 29 is provided at the left-hand end of the sector 13 to serve as a stop to limit the opening motion of the valve plug.

In order to form a seat for a helical spring 30 located within a horizontal socket 31 near the top of the plug 18, the lever 25 is inwardly offset at 32, as clearly shown in Fig. 3. The spring 30 is held at its outer end by a bolt 33 having its inner end screwed into the outer open end of the socket 31. Surrounding the bolt 33 is a tapered horizontal handle 34 having a cylindrical recess 35 at its outer end adapted to form a seat 36 for the slotted head 37 of the bolt 33.

To prevent the thin outer edge of the lever 25 from cutting or otherwise injuring the finger of the user, a curved finger pad 38 is provided on the outer part of the upper end of the lever 25.

*Operation.*—In operation, assuming the valve to be in closed position, when it is desired to turn on the gas, it will only be necessary for the user to press inwardly on the finger pad 38 of the lever 35, thereby moving the locking extremity 27 out of the slot 14.

The handle 34 may then be swung from the dotted line closed position to the full line open position shown in Fig. 2. When it is desired to turn off the gas, it will only be necessary to swing the handle 34 in the opposite direction; i. e. from the full line position to the dotted line position shown in Fig. 2, it being unnecessary to touch the spring-pressed lever 25. At the end of the swinging movement of the handle 34 the spring 30 which presses against the upper portion of the lever 35 will cause the lower extremity 27 of said lever to automatically snap inwardly into the slot 14, thereby locking the valve securely against accidental opening.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a gas valve cock, a casing, a valve plug fitting within said casing, a lever pivoted to said plug having a depending lower extremity for detachably engaging a locking slot in said valve casing, a transverse handle secured to said plug, a bolt located within said handle for securing said handle to said plug, a spring engaging the end of said bolt and pressing directly against said lever above its fulcrum for causing said depending extremity to snap into said slot automatically when the valve is closed.

2. In a gas valve cock, a casing, a valve plug fitting within said casing, a lever pivoted to said plug within a recess therein having a depending lower extremity for detachably engaging a locking slot in said valve casing, a transverse handle secured to said plug, a bolt located within said handle for securing said handle to said plug, a spring engaging the end of said bolt and pressing directly against said lever above its fulcrum for causing said depending extremity to snap into said slot automatically when the valve is closed.

3. In a gas valve cock, a casing, a valve plug fitting within said casing, a lever pivoted to said plug having a depending lower extremity for detachably engaging a locking slot in said valve casing, a transverse handle secured to said plug, a bolt located within said handle for securing said handle to said plug, a spring engaging the end of said bolt and pressing directly against said lever above its fulcrum for causing said depending extremity to snap into said slot automatically when the valve is closed, said lever having a rounded outer flange at its upper end for engagement by the user's fingers.

4. In a gas valve cock, a casing, a valve plug fitting within said casing, a thin sheet metal lever pivoted to said plug having a depending lower extremity for detachably engaging a locking slot in said valve casing, a transverse handle secured to said plug, a bolt located within said handle for securing said handle to said plug, a spring engaging the end of said bolt and pressing directly against said lever above its fulcrum for causing said depending extremity to snap into said slot automatically when the valve is closed.

5. In a gas valve cock, a casing, a valve plug fitting within said casing, a lever pivoted to said plug having a depending reduced lower extremity for detachably engaging a locking slot in said valve casing, a transverse handle secured to said plug, a bolt located within said handle for securing said handle to said plug, a spring engaging the end of said bolt and pressing directly against said lever above its fulcrum for causing said depending extremity to snap into said slot automatically when the valve is closed.

6. In a gas valve cock, a casing, a valve plug fitting within said casing, a lever pivoted to said plug having a depending lower extremity for detachably engaging a locking slot in said valve casing, a transverse handle secured to said plug, a bolt located within said handle for securing said handle to said plug, a spring in said plug engaging the end of said bolt and pressing directly against said lever above its fulcrum for causing said depending extremity to snap into said slot automatically when the valve is closed.

7. In a gas valve cock, a casing, a valve plug fitting within said casing, a lever pivoted to said plug having a depending lower extremity for detachably engaging a locking slot in said valve casing, a transverse handle secured to said plug, a bolt located within said handle for securing said handle to said plug, a spring engaging the end of said bolt and pressing directly against said lever for causing said depending extremity to snap into said slot automatically when the valve is closed.

In testimony whereof, we have affixed our signatures to this specification.

JOHN WHITE PLATT.
ARTHUR EARL KRAMER.